United States Patent
Al Saud et al.

(10) Patent No.: US 11,993,746 B2
(45) Date of Patent: May 28, 2024

(54) METHOD OF WATERFLOODING USING INJECTION SOLUTIONS CONTAINING DIHYDROGEN PHOSPHATE

(71) Applicant: Saudi Arabian Oil Company, Dhahran (SA)

(72) Inventors: Moataz Abu Al Saud, Khobar (SA); Salem Khaled Al-Shammari, Dhahran (SA); Hussain Habib Al Saleem, Dhahran (SA); Salah Hamad Al-Saleh, Dhahran (SA); Subhash Ayirala, Dhahran (SA); Ali Yousef, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/956,569

(22) Filed: Sep. 29, 2022

(65) Prior Publication Data
US 2024/0110092 A1   Apr. 4, 2024

(51) Int. Cl.
C09K 8/58 (2006.01)
E21B 43/20 (2006.01)

(52) U.S. Cl.
CPC ............... *C09K 8/58* (2013.01); *E21B 43/20* (2013.01)

(58) Field of Classification Search
None
See application file for complete search history.

(56) References Cited

U.S. PATENT DOCUMENTS

| | | | |
|---|---|---|---|
| 1,784,214 A | 12/1930 | Workman | |
| 2,795,279 A | 6/1957 | Erich | |
| 2,799,641 A | 7/1957 | Gordon | |
| 3,191,676 A | 6/1965 | Froning | |
| 3,258,071 A * | 6/1966 | Chung | C09K 8/528 166/275 |
| 3,417,823 A | 12/1968 | Faris | |
| 3,469,630 A | 9/1969 | Hurd et al. | |
| 3,507,330 A | 4/1970 | Gill | |
| 3,542,066 A | 11/1970 | Cordova | |
| 3,605,888 A | 9/1971 | Crowson et al. | |
| 3,724,543 A | 4/1973 | Bell et al. | |
| 3,782,465 A | 1/1974 | Bell et al. | |
| 3,800,874 A | 4/1974 | Kern | |
| 4,158,521 A * | 6/1979 | Anderson | C09K 17/18 166/305.1 |
| 4,296,812 A | 10/1981 | Kalfoglou | |
| 4,313,500 A | 2/1982 | Johnson, Jr. et al. | |
| 4,473,114 A | 9/1984 | Bell et al. | |

(Continued)

FOREIGN PATENT DOCUMENTS

| CA | 2096118 | 6/1995 |
|---|---|---|
| EP | 2596208 | 10/2016 |

(Continued)

OTHER PUBLICATIONS

U.S. Appl. No. 17/190,271, filed Mar. 2, 2021, Cha et al.

(Continued)

*Primary Examiner* — Charles R Nold
(74) *Attorney, Agent, or Firm* — Fish & Richardson P.C.

(57) ABSTRACT

Provided are methods of increasing the production of a hydrocarbon from a subterranean formation by waterflooding with injection solutions containing dihydrogen phosphate ions.

20 Claims, 4 Drawing Sheets

(56) References Cited

U.S. PATENT DOCUMENTS

| | | | |
|---|---|---|---|
| 4,495,990 A | 1/1985 | Titus et al. | |
| 4,501,674 A * | 2/1985 | Wu | C09K 8/54 |
| | | | 166/902 |
| 4,630,678 A | 12/1986 | Mumallah et al. | |
| 4,643,256 A | 2/1987 | Dilgren et al. | |
| 4,982,789 A | 1/1991 | Prukop | |
| 4,997,044 A | 3/1991 | Stack | |
| 5,042,297 A | 8/1991 | Lessi | |
| 5,109,922 A | 5/1992 | Joseph | |
| 5,191,557 A | 3/1993 | Rector et al. | |
| 5,510,879 A | 4/1996 | Facci et al. | |
| 5,517,024 A | 5/1996 | Mullins et al. | |
| 5,868,030 A | 2/1999 | Burmley et al. | |
| 6,555,009 B2 | 4/2003 | Varadaraj | |
| 6,691,781 B2 | 2/2004 | Grant et al. | |
| 6,814,141 B2 | 11/2004 | Huh et al. | |
| 6,877,556 B2 | 4/2005 | Wittle et al. | |
| 6,942,043 B2 | 9/2005 | Kurkoski | |
| 7,077,199 B2 | 7/2006 | Vinegar et al. | |
| 7,121,342 B2 | 10/2006 | Vinegar et al. | |
| 7,152,682 B2 | 12/2006 | Hopper | |
| 7,326,931 B2 | 2/2008 | Frodl et al. | |
| 7,352,179 B2 | 4/2008 | Chen et al. | |
| 7,704,746 B1 | 4/2010 | White et al. | |
| 7,853,045 B2 | 12/2010 | Touati et al. | |
| 7,866,383 B2 | 1/2011 | Dusterhoft et al. | |
| 7,980,301 B1 | 7/2011 | Kostrov et al. | |
| 8,327,941 B2 | 12/2012 | Hackworth et al. | |
| 8,377,730 B2 | 2/2013 | Yang et al. | |
| 8,466,799 B2 | 6/2013 | Kim et al. | |
| 8,684,076 B2 | 4/2014 | Kostrov et al. | |
| 8,776,880 B2 | 7/2014 | Pich et al. | |
| 8,950,495 B2 | 2/2015 | Barbour et al. | |
| 8,985,206 B2 | 3/2015 | Morvan et al. | |
| 9,133,709 B2 | 9/2015 | Huh et al. | |
| 9,212,542 B2 | 12/2015 | Fripp et al. | |
| 9,284,480 B2 | 3/2016 | Han et al. | |
| 9,328,597 B2 | 5/2016 | Morys | |
| 9,394,769 B2 | 7/2016 | Nenniger | |
| 9,727,928 B2 | 8/2017 | Heneman et al. | |
| 9,745,833 B2 | 8/2017 | Carvajal et al. | |
| 9,969,928 B2 | 5/2018 | He et al. | |
| 10,000,687 B2 | 6/2018 | Al-Yousef et al. | |
| 10,041,339 B2 | 8/2018 | Jerauld et al. | |
| 10,107,056 B2 | 10/2018 | Zhang et al. | |
| 10,174,597 B2 | 1/2019 | Looijer | |
| 10,184,904 B1 | 1/2019 | Gong et al. | |
| 10,196,886 B2 | 2/2019 | Tolman et al. | |
| 10,287,486 B2 | 5/2019 | Ayirala et al. | |
| 10,563,492 B2 | 2/2020 | Stokholm et al. | |
| 10,677,046 B2 | 6/2020 | Mohaghegh et al. | |
| 10,705,047 B2 | 7/2020 | Mohanty et al. | |
| 11,214,730 B1 | 1/2022 | Ayirala et al. | |
| 11,365,342 B2 * | 6/2022 | Reyes | E21B 37/06 |
| 11,421,148 B1 | 8/2022 | Al-Yousif et al. | |
| 2002/0035040 A1 | 3/2002 | Talashek et al. | |
| 2005/0087001 A1 | 4/2005 | Irani | |
| 2005/0199387 A1 | 9/2005 | Wittle et al. | |
| 2007/0246426 A1 | 10/2007 | Collins | |
| 2008/0224717 A1 | 9/2008 | Kim et al. | |
| 2009/0110242 A1 | 4/2009 | Touati et al. | |
| 2009/0277634 A1 | 11/2009 | Case | |
| 2010/0044047 A1 | 2/2010 | Kabishcher et al. | |
| 2010/0230106 A1 | 9/2010 | Milne | |
| 2011/0015874 A1 | 1/2011 | Song et al. | |
| 2011/0097218 A1 | 4/2011 | Pollack | |
| 2011/0301061 A1 | 12/2011 | McDaniel et al. | |
| 2011/0306525 A1 | 12/2011 | Lightheim | |
| 2012/0018161 A1 | 1/2012 | Al-Yousef | |
| 2012/0039668 A1 | 2/2012 | Park et al. | |
| 2012/0111093 A1 | 5/2012 | Brahim et al. | |
| 2012/0116443 A1 | 5/2012 | Ferrera et al. | |
| 2012/0125603 A1 | 5/2012 | Willingham et al. | |
| 2012/0125604 A1 | 5/2012 | Willingham et al. | |
| 2012/0127466 A1 | 5/2012 | Karnes et al. | |
| 2012/0140058 A1 | 6/2012 | McDaniel et al. | |
| 2013/0026082 A1 | 1/2013 | Al-Shafei et al. | |
| 2013/0081459 A1 | 4/2013 | Merniche | |
| 2013/0108865 A1 | 5/2013 | Boulanger et al. | |
| 2013/0274149 A1 | 10/2013 | Lafitte et al. | |
| 2013/0277046 A1 | 10/2013 | Haroun et al. | |
| 2014/0039793 A1 | 2/2014 | Querales | |
| 2014/0291591 A1 | 10/2014 | Jeon et al. | |
| 2014/0338903 A1 | 11/2014 | Mahmoud et al. | |
| 2015/0198018 A1 | 7/2015 | Farajzadeh et al. | |
| 2016/0009981 A1 | 1/2016 | Teklu et al. | |
| 2016/0024372 A1 | 1/2016 | Najafabadi | |
| 2016/0061003 A1 | 3/2016 | Gottumukkala et al. | |
| 2017/0081583 A1 | 3/2017 | Han et al. | |
| 2017/0137700 A1 | 5/2017 | Prakash | |
| 2018/0011211 A1 | 1/2018 | Leonard | |
| 2018/0030816 A1 | 2/2018 | Devalve et al. | |
| 2018/0224391 A1 | 8/2018 | Choa et al. | |
| 2018/0253514 A1 | 9/2018 | Bryant et al. | |
| 2018/0291717 A1 | 10/2018 | Aiyrala et al. | |
| 2018/0328152 A1 | 11/2018 | Hart et al. | |
| 2018/0347326 A1 | 12/2018 | Shammari et al. | |
| 2019/0194524 A1 | 6/2019 | Ayirala et al. | |
| 2019/0257182 A1 | 8/2019 | Couves et al. | |
| 2020/0018142 A1 | 1/2020 | Ayirala et al. | |
| 2020/0071600 A1 | 3/2020 | Farmer et al. | |
| 2020/0115620 A1 | 4/2020 | Ayirala et al. | |
| 2020/0157408 A1 | 5/2020 | Farmer et al. | |
| 2020/0362228 A1 | 11/2020 | Farmer et al. | |
| 2021/0179925 A1 * | 6/2021 | Farmer | E21B 43/16 |
| 2022/0073810 A1 | 3/2022 | Sinquin et al. | |

FOREIGN PATENT DOCUMENTS

| | | |
|---|---|---|
| EP | 2572187 | 7/2020 |
| JP | 6160267 | 7/2017 |
| KR | 101301953 | 8/2013 |
| RU | 2215129 | 10/2003 |
| TW | 201743031 | 12/2017 |
| WO | WO 2004053468 | 6/2004 |
| WO | WO 2005036181 | 4/2005 |
| WO | WO 2007089474 | 8/2007 |
| WO | WO 2011014202 | 2/2011 |
| WO | WO 2014160626 | 10/2014 |
| WO | WO 2016205158 | 12/2016 |
| WO | WO 2018160068 | 9/2018 |
| WO | WO 2021232058 | 11/2021 |

OTHER PUBLICATIONS

U.S. Appl. No. 17/249,461, filed Mar. 2, 2021, Cha et al.

Abdulredha et al., "Overview on petroleum emulsions, formation, influence and demulsification treatment techniques," Arabian Journal of Chemistry, vol. 13, No. 1, Nov. 22, 2018, 26 pages.

Abukhamsin et al., "Inflow profiling and production optimization in smart wells using distributed acoustic and temperature measurements," A dissertation submitted to the Department of Energy Resources Engineering the Committee on Graduate Studies of Stanford University, Jun. 2017, 193 pages.

Advincula, "Superhydrophobic Coatings and oil and Water Separation," Paper No. 9585, Nace International, Corrosion Conference and Expo, Mar. 26-30, 2017, 7 pages.

Al Hamad et al., "Dynamic Water Flooding in Carbonates: The Role of Iodide Ions," SPE-188026-MS, presented at the SPE Kingdom of Saudi Arabia Annual Technical Symposium and Exhibition, Dammam, Saudi Arabia, Apr. 2017, 17 pages.

Al-Anazi et al., "Innovative Production Optimization Technique for Smart Well Completions Using Real-Time Nodal Analysis Applications," SPE-189198-MS, Society of Petroleum Engineers (SPE), presented at the SPE Symposium: Production Enhancement and Cost Optimisation, Nov. 7-8, 2017, 14 pages.

Alboudwarej et al., "Rheology of Heavy-Oil Emulsions," SPE 97886, presented at the 2005 SPE/PS-CIM/CHOA International Thermal Operations and Heavy Oil Symposium, SPE Production & Operations, Aug. 2007, 9 pages.

(56) References Cited

OTHER PUBLICATIONS

Alghamdi et al., "SmartWater Synergy with Surfactant Chemicals: An Electro-Kinetic Study," SPE-197239-MS, Society of Petroleum Engineers (SPE), presented at the Abu Dhabi International Petroleum Exhibition and Conference, Nov. 11-14, 2019, 12 pages.

Alghazal et al., "Integrated Water Management and Surveillance Strategies in a Giant Carbonate Field from Saudi Arabia," SPE 164421, Society of Petroleum Engineers (SPE), presented at the SPE Middle East Oil and Gas Show and Conference, Manama, Bahrain, Mar. 2013, 8 pages.

Alkandari et al., "Technical Advancement of Carbonate Acid Stimulation Injection," SPE-197982-MS, Society of Petroleum Engineers (SPE), presented at the SPE Kuwait Oil & Gas Conference and Show, Oct. 13-16, 2019, 22 pages.

Allenson et al., "Application of Emulsion Viscosity Reducers to Lower Produced Fluid Viscosity," OTC 22443, Offshore Technology Conference, Oct. 4-6, 2011, 10 pages.

Alsabagh et al., "Demulsification of W/O emulsion at petroleum field and reservoir conditions using some demulsifiers based on polyethylene and propylene oxides," Egyptian Journal of Petroleum, Dec. 2016, vol. 25, Issue 4, Egyptian Petroleum Research Institute, 11 pages.

Alves et al., "Influence of the salinity on the interfacial properties of a Brazilian crude oil-brine systems," Fuel, Feb. 2014, 118:21-26, 6 pages.

Al-Yaari et al., "Pressure drop reduction of stable water-in-oil emulsion flow: Role of water fraction and pipe diameter," IPTC 16883, presented at the International Petroleum Technology Conference, Mar. 26-28, 2013, 9 pages.

Arabzadeh et al., "Application of a Novel Ultrasonic Technology to Improve Oil Recovery with an Environmental Viewpoint," Journal of Petroleum and Environmental Biotechnology, Jan. 2017, 8(2):1000323, 6 pages.

Arffin et al., "The rheology of light crude oil and water-in-oil emulsion," Procedia Engineering, 4th International Conference on Process Engineering and Advanced Materials, Dec. 2016, 148:1149-1155, 7 pages.

Ayirala et al., "Water ion interactions at crude oil-water interface: A new fundamental understanding of SmartWater flood," Spe 183894-MS, Society of Petroleum Engineers (SPE), presented at the SPE Middle East Oil and Gas Show and Conference, Mar. 6-9, 2017, 17 pages.

Beaubien et al., "Monitoring of near-surface gas geochemistry at the Weyburn, Canada, CO2-EOR site, 2001-2011," International Journal of Greenhouse Gas Control, Elsevier Ltd., Jun. 2013, 16(1):S236-S262, 27 pages.

Brouwer et al., "Recovery Increase through Water Flooding with Smart Well Technology," SPE 68979, Society of Petroleum Engineers (SPE), presented at the SPE European Formation Damage Conference, May 21-22, 2001, 10 pages.

Bukhamsin et al., "Optimization of multilateral well design and location in a real field using a continuous genetic algorithm," SPE 136944, Society of Petroleum Engineers (SPE), presented at the SPE/DGS Annual Saudi Arabia Section Technical Symposium and Exhibition, Apr. 4-7, 2010, 16 pages.

Butkus et al., "Surface complexation modeling of phosphate adsorption by water treatment residual," American Society of Agronomy, Crop Science Society of America, and Soil Science Society of America, Sep. 1998, 27(5):1055-1063, 9 pages.

Cetkovic et al., "A methodology for multilateral wells optimization—field case study," SPE 183004-MS, Society of Petroleum Engineers (SPE), presented at the Abu Dhabi International Petroleum Exhibition & Conference, Nov. 7-10, 2016, 18 pages.

Chen et al., "Demulsifying water-in-oil emulsions by ethyl cellulose demulsifiers studied using focused beam reflectance measurement," Chemical Engineering Science, Jul. 2015, 130, 10 pages.

Edabi et al., "Techniques for Optimum Placement of Interval Control Valve(s) in an Intelligent Well," SPE 100191, Society of Petroleum Engineers (SPE), presented at the SPE Europec/EAGE Annual Conference and Exhibition, Austria, Jun. 12-15, 2006, 11 pages.

Elmsallati and Davies, "Automatic Optimization of Infinite Variable Control Valves," IPTC-10319, International Petroleum Technology Conferences (IPTC), presented at the International Petroleum Technology Conference, Qatar, Nov. 21-23, 2005, 7 pages.

Farshi, "Improving Genetic Algorithms for Optimum Well Placement," Master's Report, Department of Energy Resources Engineering, Stanford University, California, Jun. 2008, 94 pages.

flow-industries.com (online), "AirShock Enhanced Oil Recovery," available on or before 2015, retrieved on Nov. 6, 2020, retrieved from URL <https://www.flow-industries.com/oil-and-gas-wells/>, 4 pages.

Galstyan et al., "$TiO_2$ Nanotubes: Recent Advances in Synthesis and Gas Sensing Properties," Sensors, Oct. 2013, 13(11):14813-14838, 26 pages.

Ghosh et al., "Compatibility evaluation of modified seawater for EOR in carbonate reservoirs through the introduction of polyphosphate compound," Petroleum Science, Apr. 2020, 17(2):393-408, 16 pages.

Ghosh et al., "Optimization of Smart Well Completion Design in the Presence of Uncertainty," SPE 166008, Society of Petroleum Engineers (SPE), presented at the SPE Reservoir Characterization and simulation Conference and Exhibition held in Abu Dhabi, Sep. 16-18, 2013, 17 pages.

Gilev, "Acoustic Well Stimulation of Near-Wellbore Zone for Enhanced Oil Recovery," Center of Ultrasound Technology (CUT Service), 2016, 38 pages.

Glandt, "Reservoir Aspects of Smart Wells," SPE 81107, Society of Petroleum Engineers (SPE), presented at the SPE Latin America and Caribbean Petroleum Engineering Conference, Trinidad, Apr. 27-30, 2003, 11 pages.

Gupta et al., "Enhanced waterflood for carbonate reservoirs-impact of injection water composition," SPE Middle East oil and gas show and conference, Jan. 2011, 21 pages.

Haupt et al., "Practical Genetic Algorithms," 2nd Edition, John Wiley & Sons, New York, 1-253, 2004, 261 pages.

He, "Destabilization and treatment of produced oil-water emulsions for EOR application using dissolved air flotation technique," in partial fulfillment of the requirements of the degree of Master of Science in Petroleum Engineering, May 2015, 127 pages.

Holland, "Genetic algorithms," Scientific American, Jul. 1992, 66-79, 14 pages.

Jalali et al., "Intelligent Completion System—The Reservoir Rationale," SPE 50587, Society of Petroleum Engineers (SPE), presented at the SPE European Petroleum Conference, Oct. 20-22, 1998, 6 pages.

Kokal et al., "Reducing Pressure Drop in Offshore Pipelines by Controlling the Viscosities of Pressurized Emulsions," SPE 81511, presented at the SPE Middle East Oil Show, Apr. 5-8, 2003, 10 pages.

Kokal, "Chapter 12: Crude Oil Emulsions," Petroleum Engineering Handbook—vol. 1, Sep. 30, 2006, 38 pages.

Kumar et al., "Emulsion Flooding of Heavy Oil," SPE 129914, presented at the 2010 SPE Improved Oil Recovery Symposium, Apr. 24-28, 2010, 13 pages.

Lakatos et al., "Effect of IOR/EOR chemicals on interfacial rheological properties of crude oil/water systems," SPE 65391, Society of Petroleum Engineers (SPE), presented at the 2001 SPE International Symposium on Oilfield Chemistry, Feb. 2001, 10 pages.

Liu et al., "Favorable Attributes of Alkaline-Surfactant-Polymer Flooding," SPE 99744, Society of Petroleum Engineers (SPE), presented at the 2006 SPE/DOE Symposium on Improved Oil Recovery, Apr. 22-26, 2006, SPE Journal, Mar. 2008, 12 pages.

Lorenz et al., "Uniform Inflow Completion System Extended Economic Field Life: A Field Case Study and Technology Overview," SPE 101895, Society of Petroleum Engineers (SPE), presented at the SPE Annual Technical Conference and Exhibition, Texas, Sep. 24-27, 2006, 9 pages.

Ma et al., "Adsorption of Cationic and Anionic Surfactants on natural and Synthetic Carbonate Materials," Journal of Colloid and Interface Science, 408:164-172, 2013, 9 pages.

(56) References Cited

OTHER PUBLICATIONS

Malkin et al., "Chapter 2: Viscoelasticity," in Rheology: Concepts, Methods, and Applications, 84 pages.

Maziarz et al., "Nanostructured TiO2-based gas sensors with enhanced sensitivity to reducing gases," Beilstein Journal of Nanotechnology, Nov. 2016, 7:1718-1726, 9 pages.

Meng et al., "A Novel Approach of Using Phosphate-spiked Smart Brines to Alter Wettability in Mixed Oil-wet Carbonate Reservoirs," SPE-177551-MS, Society of Petroleum Engineers, presented at the Abu Dhabi International Petroleum Exhibition and Conference held in Abu Dhabi, UAE, Nov. 2015, 16 pages.

Mitchell, "An Introduction to Genetic Algorithms," Chapter 1-4, Chapter 6, Appendix A-B, MIT Press, 1996, 162 pages.

Mullakaev et al., "Development of Ultrasonic Equipment and Technology for Well Stimulation and Enhanced Oil Recovery," Journal of Petroleum Science and Engineering, 2015, 125:201-208, 8 pages.

Nair et al., "Smart Water for Enhanced Oil Recovery by Nano-Filtration," Journal of Petroleum & Environmental Biotechnology, Mar. 2016, 7:2, 8 pages.

Naus et al., "Optimization of Commingled Production using Infinitely Variable Inflow Control Valves," SPE 90959, Society of Petroleum Engineers (SPE), presented at the SPE Annual Technical Conference and Exhibition, Texas, Sep. 26-29, 2004, 12 pages.

Pak et al., "Multiscale pore-network representation of heterogeneous carbonate rocks," AGU Publications, Water Resources Research, 52: 5433-5441, 2016, 9 pages.

Plasencia et al., "Pipe flow of water-in-crude oil emulsions: Effective viscosity, inversion point and droplet size distribution," Journal of Petroleum Science and Engineering, vol. 101, Jan. 1, 2013, 9 pages.

Qureshi et al., "The Interpretation of Permeability Changes during Acid Injection in Carbonates: A New Integrated Methodology," SPE-177609-MS, Society of Petroleum Engineers (SPE), presented at the Abu Dhabi International Petroleum Exhibition and Conference, Nov. 9-12, 2015, 8 pages.

Radcliff, "Forma Analysis and Random Respectful Recombination," EPCC-TR-91-02, proceedings of 4th International Conference and Genetic Algorithms, San Mateo, CA, 1991, 9 pages.

Rudolph, "Convergence Analysis of Canonic Genetic Algorithms," IEEE Transactions on Neural Networks, Special Issue on Evolutionary Computational 5:1, Jan. 1994, 6 pages.

Sigmaaldrich.com [online], "Whatman® Anodisc inorganic filter membrane" Nov. 2015, [retrieved on May 13, 2021], retrieved from: URL <https://www.sigmaaldrich.com/catalog/product/aldrich/wha68096002?lang=en&region=US>, 2 pages.

Sinha et al., "Flow Equilibration Toward Horizontal Well Using Downhole Valves," SPE 68635, Society of Petroleum Engineers (SPE), presented at the SPE Asia Pacific Oil and Gas Conference and Exhibition, Indonesia, Apr. 17-19, 2001, 6 pages.

Spiteri et al., "Surface complexation effects on phosphate adsorption to ferric iron oxyhydroxides along pH and salinity gradients in estuaries and coastal aquifers," Geochimica et Cosmochimica Acta, Jul. 2008, 72(14):3431-3445, 15 pages.

Tagavifar et al., "Effect of pH on Absorption of Anionic Surfactants on Limestone: Experimental Study and Surface Complexation Modeling," Colloids and Surfaces A: Physiocochemical and Engineering Aspect 538:549-558, Feb. 5, 2018, 10 pages.

Thomas et al., "Alkali and Hybrid-Alkali Flooding as a Tertiary Oil Recovery Mode: Prospects and Challenges," International Journal of Petroleum and Petrochemical Engineering, 2(2), 2016, 22-31, 10 pages.

Tjoeng et al., "Viscosity Modelling of Pyrenees Crude Oil Emulsions," presented at the SPE Asia Pacific Oil and Gas Conference and Exhibition, Oct. 25-27, 2016, 18 pages.

Wasan et al., "Observations on the coalescence behavior of oil droplets and emulsion stability in enhanced oil recovery," SPE6846, Society of Petroleum Engineers (SPE) of AIME, Dec. 1978, 9 pages.

Westermark et al., "Enhanced Oil Recovery with Downhole Vibration Stimulation," SPE 67303, Society of Petroleum Engineers (SPE), presented at the SPE Production and Operations Symposium, Mar. 24-17, 2001, 13 pages.

Williams et al., "Chapter 4: Fluid Sampling," Petroleum Engineering Handbook, vol. 1, Sep. 30, 2006, 44 pages.

Wooden et al., "Seismic Stimulation: An Eco-Friendly, Effective EOR Alternative," Technology Update, JPT, Aug. 2018, 3 pages.

Xylem, "ViscoClock plus Automatische Viskositatsmessung Einfach Und Genau," Jul. 1, 2016, 2 pages.

Yeten et al., "Effectiveness of Intelligent Completions in a Multiwell Development," SPE 68077, Society of Petroleum Engineers (SPE), presented at the 2001 SPE Middle East Oil Show, Bahrain, Mar. 17-20, 2001, 7 pages.

Yi et al., "Research on crude oil demulsification using the combined method of ultrasound and chemical demulsifier," Journal of Chemistry, Mar. 2017, vol. 2017, Article IDS 9147926, 8 pages.

Yousef et al., "Laboratory Investigation of the Impact of Injection-Water Salinity and Ionic Content on Oil Recovery for Carbonate Reservoirs," SPE 137634-PA, Society of Petroleum Engineers (SPE), SPE Reservoir Evaluation and Engineering 14:05, Oct. 2011, 5 pages, Abstract only.

Zhang et al., "Favorable Attributes of Alkali-Surfactant-Polymer Flooding," SPE 99744, Society of Petroleum Engineers (SPE), presented at the 2006 SPE/DOE Symposium on Improved Oil Recovery, Apr. 22-26, 2006, 13 pages.

Zhang et al., "Hyperbranched poly(amido amine) demulsifiers with ethylenediamide/1,3-propanediamine as an initiator for oil-in-water emulsions with microdroplets," Fuel, IPC Science and Technology Press, vol. 226, Apr. 11, 2018, 8 pages.

Zhang et al., "Wettability alteration and improved oil recovery by spontaneous imbibition of seawater into chalk: Impact of the potential determining ions Ca2+, Mg2+, and SO4 2-," Colloid and Surfaces, ScienceDirect, Apr. 2007, 10 pages.

Zhao, "RPSEA Final Technical Report: Heavy viscous oil pressure, volume and temperature," 08121-2201-02, Research Partnership to Secure Energy for America (RPSEA), Feb. 4, 2015, 250 pages.

PCT International Search Report and Written Opinion in International Appln. No. PCT/US2023/033617, dated Dec. 22, 2023, 15 pages.

\* cited by examiner

METHOD OF WATERFLOODING USING INJECTION SOLUTIONS CONTAINING DIHYDROGEN PHOSPHATE

TECHNICAL FIELD

The disclosure describes methods of waterflooding using injection solutions containing dihydrogen phosphate ions ($H_2PO_4^-$). The concentration of dihydrogen phosphate ions in the injection solutions can be tapered.

BACKGROUND

Efficient and effective practices of oil production from subterranean formations require a detailed understanding of the physicochemical processes relevant to the oil recovery process. Water injection is a widely used method for improving hydrocarbon recovery. The injection water or brine is typically underground aquifer water, surface water, and/or seawater, depending on the location of subterranean formation and water sources. Injection water salinity plays a major role in governing oil recovery from carbonate formations due to its strong effect on wettability. Specifically, some individual ions dissolved in brines have been shown to have favorable effects on the wettability, while other ions have not shown any impact on the reservoir wettability. Thus, there is a need for a method for providing favorable wettability alteration and enhanced oil recovery in carbonates

SUMMARY

Provided in the present disclosure is a method of waterflooding. In some embodiments, the method of waterflooding includes introducing a first injection solution including about 400 ppm to about 1000 ppm of dihydrogen phosphate ions into a subterranean formation; and introducing a second injection solution including dihydrogen phosphate ions into the subterranean formation, wherein the second injection solution has a concentration of dihydrogen phosphate ions of about 200 ppm to about 800 ppm, and a concentration of dihydrogen phosphate ions of at least about 200 ppm less than the first injection solution, and wherein at least a portion of a hydrocarbon present in the subterranean formation is displaced.

In some embodiments, the first injection solution has a pH of about 5.0 to about 5.5.

In some embodiments, the second injection solution has a pH of about 5.0 to about 5.5.

In some embodiments, the first injection solution includes seawater.

In some embodiments, the second injection solution includes seawater.

In some embodiments, an amount of the first injection solution introduced into the subterranean formation is about 0.3 to about 0.5 pore volumes.

In some embodiments, an amount of the second injection solution introduced into the subterranean formation is about 0.3 to about 0.5 pore volumes.

In some embodiments, the first injection solution includes about 1000 ppm of dihydrogen phosphate ions.

In some embodiments, the first injection solution includes seawater.

In some embodiments, the second injection solution includes seawater.

In some embodiments, the method of waterflooding further includes introducing a chase solution, including aquifer water, surface water, seawater, or combinations thereof, into the subterranean formation.

In some embodiments, an amount of the chase solution introduced into the subterranean formation is about 0.5 to about 1.0 pore volumes.

In some embodiments, the subterranean formation includes a carbonate formation.

In some embodiments, the first injection solution is introduced after primary production of a hydrocarbon from the subterranean formation.

In some embodiments, the method of waterflooding further includes producing the hydrocarbon from the subterranean formation.

Also provided in the present disclosure is a method of waterflooding, including introducing a first injection solution including about 1000 ppm of dihydrogen phosphate ions into a subterranean formation; introducing a second injection solution including about 800 ppm of dihydrogen phosphate ions into the subterranean formation; introducing a third injection solution including about 600 ppm of dihydrogen phosphate ions into the subterranean formation; introducing a fourth injection solution including about 400 ppm of dihydrogen phosphate ions into the subterranean formation; and introducing a fifth injection solution including about 200 ppm of dihydrogen phosphate ions into the subterranean formation, wherein at least one of the first injection solution, the second injection solution, the third injection solution, the fourth injection solution, and the fifth injection solution displaces at least a portion of a hydrocarbon present in the subterranean formation.

In some embodiments, the first injection solution, the second injection solution, the third injection solution, the fourth injection solution, and/or the fifth injection solution has a pH of about 5.0 to about 5.5.

In some embodiments, the first injection solution, the second injection solution, the third injection solution, the fourth injection solution, and/or the fifth injection solution includes seawater.

In some embodiments, an amount of the first injection solution, the second injection solution, the third injection solution, the fourth injection solution, and/or the fifth injection solution introduced into the subterranean formation is about 0.3 to about 0.5 pore volumes.

In some embodiments, the method of waterflooding further includes injecting a chase solution, including aquifer water, surface water, seawater, or combinations thereof, into the subterranean formation.

In some embodiments, an amount of the chase solution introduced into the subterranean formation is about 0.5 to about 1.0 pore volumes.

In some embodiments, the subterranean formation includes a carbonate formation.

In some embodiments, the first injection solution is introduced after primary production of a hydrocarbon from the subterranean formation.

In some embodiments, the method of waterflooding further includes producing the hydrocarbon from the subterranean formation.

DESCRIPTION OF DRAWINGS

FIG. 4A shows seawater without salt additives and FIG. 4B shows seawater with 1000 ppm of sodium dihydrogen phosphate.

DETAILED DESCRIPTION

Figure 1:
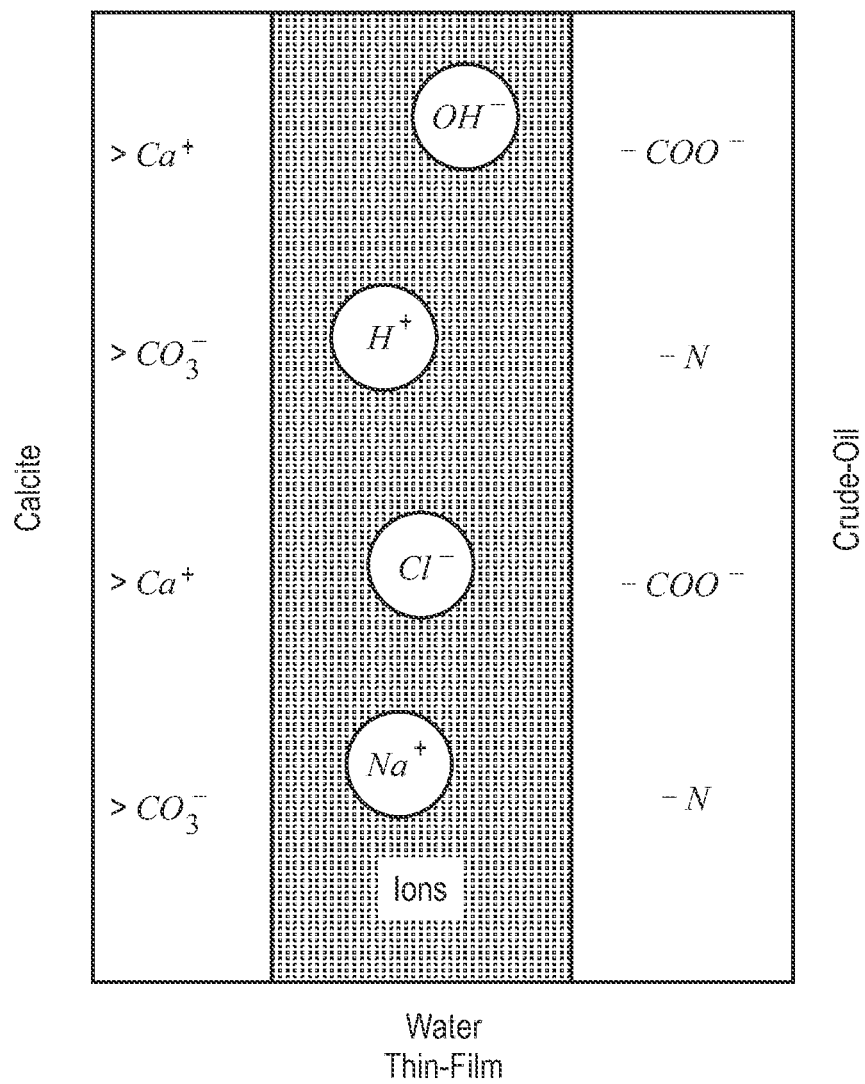
FIG. 1 shows various ions inside a thin-film water layer squeezed between a calcite surface and crude oil.

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

Water injection can be used to improve hydrocarbon recovery from a subterranean formation by increasing the pressure in the subterranean formation and displacing the hydrocarbons. Water injection can be performed after primary recovery of the subterranean formation. Underground aquifer, surface water and/or seawater can be used as the injection water depending on the location. Typically, for a pH between 5 and 8, the brine/crude oil zeta-potential is negative due the carboxylate groups in the crude oil surface, while the brine/carbonate zeta-potential is positive due to dissolved magnesium and calcium ions in brine solutions that interact and adsorb on the calcite surface. Salinity of the injection water can alter the surface charges and corresponding zeta-potential, thereby affecting the hydrocarbon recovery from carbonate formations due to the effects on wettability. However, the concentrations of some ions affect the wettability while other do not. Adding certain anions, such as iodide, sulfate, and/or borate, into the brine solution can alter the brine/carbonate zeta-potential to become negative, thereby creating a repulsion between the brine/carbonate and brine/crude oil interfaces. This electrostatic repulsion alters the wettability towards more water-wet, and thereby leads to additional hydrocarbon recovery.

Provided in the present disclosure are compositions and methods for waterflooding in hydrocarbon recovery process from subterranean formations. The compositions contain dilute concentrations of sodium dihydrogen phosphate ($NaH_2PO_4$), such as 200-1000 ppm, in the injection water. Without wishing to be bound by any particular theory, it is believed that the dihydrogen phosphate ions ($H_2PO_4^-$) interact with both calcite/brine and oil/brine interfaces to alter the surface charge to be negative or more negative and improve the wettability towards a water-wet state in carbonates, thereby increasing hydrocarbon production.

Furthermore, $H_2PO_4^-$ ions can also reduce the pH of injection water towards a slightly acidic pH range, such as 5.0-5.5. Without wishing to be bound by any particular theory, it is believed that the slightly acidic pH can remove blockage of pore throats and cause mineral dissolution to increase permeability and improve the pore connectivity without causing corrosion of components of the hydrocarbon producing well.

The proposed water composition can thereby serve as an improved oil recovery (IOR) agent in water flooding applications to increase hydrocarbon recovery relative to other waterflooding methods. The methods include introducing 0.3 to 0.5 pore volumes of injection solution containing $H_2PO_4^-$ ions as the main oil recovery slug followed by up to 1.0 pore volume of regular injection water as chase water. The main recovery slug can also be tapered by successively decreasing the dihydrogen phosphate ion concentrations. In some embodiments, the dihydrogen phosphate ion concentration is successively decreased from 1,000 ppm to 200 ppm using the concentration step size of 200 ppm.

Definitions

Unless otherwise defined, all technical and scientific terms used in this document have the same meaning as commonly understood by one of ordinary skill in the art to which the present application belongs. Methods and materials are described in this document for use in the present application; other, suitable methods and materials known in the art can also be used. The materials, methods, and examples are illustrative only and not intended to be limiting. All publications, patent applications, patents, sequences, database entries, and other references mentioned in this document are incorporated by reference in their entirety. In case of conflict, the present specification, including definitions, will control.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (for example, 1%, 2%, 3%, and 4%) and the sub-ranges (for example, 0.1% to 1.1% to 2.2%, and 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

The term "about," as used in this disclosure, can allow for a degree of variability in a value or range, for example, within 10%, within 5%, or within 1% of a stated value or of a stated limit of a range.

As used in this disclosure, the terms "a," "an," and "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

In the methods described in this disclosure, the acts can be carried out in any order, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

As used in this disclosure, the term "subterranean formation" can refer to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region that is in fluid contact with the wellbore. Subterranean materials can include any materials placed into the wellbore such as cement, drill shafts, liners, tubing, casing, or screens; placing a material in a subterranean formation can include contacting with such subterranean materials. In some examples, a subterranean formation or material can be any below-ground region that can produce liquid or gaseous petroleum materials, water, or any section below-ground that is in fluid contact with liquid or gaseous petroleum materials or water. In some embodiments, a subterranean formation is an oil well.

As used in this disclosure, the term "waterflooding" refers to a method of secondary recovery in which water is injected into the subterranean formation to displace residual hydrocarbons, such as oil, and increase the production of the hydrocarbon from the subterranean formation. The water from injection wells physically sweeps the displaced hydrocarbon, such as oil, to adjacent production wells.

Method for Enhancing Hydrocarbon Recovery from a Subterranean Formation

Provided in the present disclosure are methods for enhancing hydrocarbon recovery from a subterranean formation using waterflooding after primary production of the subterranean formation. The methods include waterflooding with injection solutions containing dihydrogen phosphate ions. In some embodiments, the subterranean formation is porous. In some embodiments, the subterranean formation includes carbonate formations, such as calcite.

Thus, provided in the present disclosure is a method of waterflooding, the method including introducing a first injection solution containing about 400 ppm to about 1000 ppm of dihydrogen phosphate ions into a subterranean formation and introducing a second injection solution containing dihydrogen phosphate ions into the subterranean formation, where the second injection solution has a concentration of dihydrogen phosphate ions of about 200 ppm to about 800 ppm, and a concentration of dihydrogen phosphate ions of at least about 200 ppm less than the first injection solution, and where at least one of the first injection solution and or the second injection solution displaces at least a portion of a hydrocarbon present in the subterranean formation.

Injection Solutions for Waterflooding Containing Dihydrogen Phosphate Ions

In general, a first injection solution is introduced into a subterranean formation. In some embodiments, the concentration of dihydrogen phosphate ions in the first injection solution is about 200 ppm to about 1000 ppm, such as about 200 ppm to about 300 ppm, about 200 ppm to about 400 ppm, about 200 ppm to about 500 ppm, about 200 ppm to about 600 ppm, about 200 ppm to about 700 ppm, about 200 ppm to about 800 ppm, about 200 ppm to about 900 ppm, about 300 ppm to about 400 ppm, about 300 ppm to about 500 ppm, about 300 ppm to about 600 ppm, about 300 ppm to about 700 ppm, about 300 ppm to about 800 ppm, about 300 ppm to about 900 ppm, about 300 ppm to about 1000 ppm, about 400 ppm to about 500 ppm, about 400 ppm to about 600 ppm, about 400 ppm to about 700 ppm, about 400 ppm to about 800 ppm, about 400 ppm to about 900 ppm, about 400 ppm to about 1000 ppm, about 500 ppm to about 600 ppm, about 500 ppm to about 700 ppm, about 500 ppm to about 800 ppm, about 500 ppm to about 900 ppm, about 500 ppm to about 1000 ppm, about 600 ppm to about 700 ppm, about 600 ppm to about 800 ppm, about 600 ppm to about 900 ppm, about 600 ppm to about 1000 ppm, about 700 ppm to about 800 ppm, about 700 ppm to about 900 ppm, about 700 ppm to about 1000 ppm, about 800 ppm to about 900 ppm, about 800 ppm to about 1000 ppm, about 900 ppm to about 1000 ppm, about 200 ppm, about 300 ppm, about 400 ppm, about 500 ppm, about 600, ppm, about 700 ppm, about 800 ppm, about 900 ppm, or about 1000 ppm. In some embodiments, the concentration of dihydrogen phosphate ions in the first injection solution is about 1000 ppm. Without wishing to be bound by any particular theory, it is believed that a concentration of dihydrogen phosphate ions of more than about 1000 ppm can cause the injection solutions to be acidic and corrosive. It is also believed that a concentration of dihydrogen phosphate ions of more than about 1000 ppm can increase costs. On the other hand, it is believed concentrations of dihydrogen phosphate ions less than about 200 ppm may not impact the reservoir wettability.

In some embodiments, a second injection solution is introduced into the subterranean formation after introduction of the first injection solution. In some embodiments, the second injection solution has a concentration of dihydrogen phosphate ions of about 200 ppm to about 800 ppm, and a concentration of dihydrogen phosphate ions of at least about 200 ppm less than the first injection solution. In some embodiments, the concentration of dihydrogen phosphate ions in the second injection solution is about 200 ppm to about 800 ppm, such as about 200 ppm to about 300 ppm, about 200 ppm to about 400 ppm, about 200 ppm to about 500 ppm, about 200 ppm to about 600 ppm, about 200 ppm to about 700 ppm, about 300 ppm to about 400 ppm, about 300 ppm to about 500 ppm, about 300 ppm to about 600 ppm, about 300 ppm to about 700 ppm, about 300 ppm to about 800 ppm, about 400 ppm to about 500 ppm, about 400 ppm to about 600 ppm, about 400 ppm to about 700 ppm, about 400 ppm to about 800 ppm, about 500 ppm to about 600 ppm, about 500 ppm to about 700 ppm, about 500 ppm to about 800 ppm, about 600 ppm to about 700 ppm, about 600 ppm to about 800 ppm, about 700 ppm to about 800 ppm, about 200 ppm, about 300 ppm, about 400 ppm, about 500 ppm, about 600, ppm, about 700 ppm, or about 800 ppm. In some embodiments, the concentration of dihydrogen phosphate ions in the second injection solution is about 800 ppm. In some embodiments, the concentration of dihydrogen phosphate ions in the second injection solution is about 600 ppm. In some embodiments, the concentration of dihydrogen phosphate ions in the second injection solution is about 500 ppm. In some embodiments, the concentration of dihydrogen phosphate ions in the second injection solution is about 400 ppm. In some embodiments, the concentration of dihydrogen phosphate ions in the second injection solution is about 200 ppm.

In some embodiments, a first injection solution containing dihydrogen phosphate ions is introduced into the subterranean formation, and additional injection solutions are introduced such that the concentration of dihydrogen phosphate ions is successively tapered from about 1000 ppm to about 200 ppm, such as about 300 ppm to about 200 ppm, about 400 ppm to about 200 ppm, about 500 ppm to about 200 ppm, about 600 ppm to about 200 ppm, about 700 ppm to about 200 ppm, about 800 ppm to about 200 ppm, about 900 ppm to about 200 ppm, about 400 ppm to about 300 ppm, about 500 ppm to about 300 ppm, about 600 ppm to about 300 ppm, about 700 ppm to about 300 ppm, about 800 ppm to about 300 ppm, about 900 ppm to about 300 ppm, about 1000 ppm to about 300 ppm, about 500 ppm to about 400 ppm, about 600 ppm to about 400 ppm, about 700 ppm to about 400 ppm, about 800 ppm to about 400 ppm, about 900 ppm to about 400 ppm, about 1000 ppm to about 400 ppm, about 600 ppm to about 500 ppm, about 700 ppm to about 500 ppm, about 800 ppm to about 500 ppm, about 900 ppm to about 500 ppm, about 1000 ppm to about 500 ppm, about 700 ppm to about 600 ppm, about 800 ppm to about 600 ppm, about 900 ppm to about 600 ppm, about 1000 ppm to about 600 ppm, about 800 ppm to about 700 ppm, about 900 ppm to about 700 ppm, about 1000 ppm to about 700 ppm, about 900 ppm to about 800 ppm, about 1000 ppm to about 800 ppm, or about 1000 ppm to about 900 ppm. In some embodiments, a first injection solution containing dihydrogen phosphate ions is introduced into the subterranean formation, and additional injection solutions are introduced such that the concentration of dihydrogen phosphate ions is successively tapered from about 1000 ppm to about 200 ppm.

In some embodiments, the dihydrogen phosphate ion concentration step size between successive injection solutions is reduced by about 100 ppm, about 200 ppm, about 300 ppm, about 400 ppm, about 500 ppm, about 600 ppm, about 700 ppm, or about 800 ppm. In some embodiments, the dihydrogen phosphate ion concentration step size between successive injection solutions is reduced by about 200 ppm. Without wishing to be bound by any particular theory, it is believed that tapering the concentration by successively decreasing the dihydrogen phosphate ions at step size of about 200 ppm can maximize the wettability alteration process and do so without excess costs. Using a smaller step-size, such as about 100 ppm, would increase operational costs without any significant benefits relative to a step size of about 200 ppm. Using a larger step size, such as about 500 ppm, may result in reduced hydrocarbon recovery relative to a step size of about 200 ppm.

In some embodiments, two, three, four, or five injection solutions containing dihydrogen phosphate ions are successively introduced into the subterranean formation, where each successive injection solution is less concentrated than the previous injection solution.

In some embodiments, a first injection solution containing about 1000 ppm of dihydrogen phosphate ions, a second injection solution containing about 800 ppm of dihydrogen phosphate ions, a third injection solution containing about 600 ppm of dihydrogen phosphate ions, a fourth injection solution containing about 400 ppm of dihydrogen phosphate ions, and a fifth injection solution containing about 200 ppm of dihydrogen phosphate ions are successively introduced into the subterranean formation.

Examples of the water sources for the injection solution, such as the first, second, third, fourth, and fifth injection solution, include aquifer water, surface water and seawater. In some embodiments, the water source for the injection solution is seawater. In some embodiments, a salt containing dihydrogen phosphate ions, such as sodium dihydrogen phosphate ($NaH_2PO_4$), and/or potassium dihydrogen phosphate ($KH_2PO_4$), is added to the water source to obtain the injection solution. In some embodiments, a salt containing dihydrogen phosphate ions is added to an existing water injection pipeline, such as, a seawater injection pipeline, prior to a wellhead of an injection well.

In some embodiments, the amount of the injection solution, such as the first, second, third, fourth and fifth injection solution, is about 0.3 to about 0.5 pore volumes, such as about 0.3 to about 0.4 pore volumes, about 0.4 to 0.5 pore volumes, about 0.3 pore volumes, about 0.4 pore volumes, about 0.5 pore volumes. In some embodiments, the amount the injection solution is about 0.3 to about 0.5 pore volumes In some embodiments, the pH of the injection solution, such as the first, second, third, fourth and fifth injection solution, is about 5.0 to about 5.5, such as about 5.0 to about 5.1, about to about 5.2, about 5.0 to about 5.3, about 5.0 to about 5.4, about 5.1 to about 5.2, about 5.1 to about 5.3, about 5.1 to about 5.4, about 5.1 to about 5.5, about 5.2 to about 5.3, about 5.2 to about 5.4, about 5.2 to about 5.5, about 5.3 to about 5.4, about 5.3 to about 5.5, about 5.4 to about 5.5, about 5.0, about 5.1, about 5.2, about 5.3, about 5.4, or about 5.5. In some embodiments, the pH of the injection solution is about 5.0 to about 5.5. Without wishing to be bound by theory, it is believed that the slightly acidic pH of the injection solution can remove blockage of pore throats and cause some mineral dissolution resulting in an increase in permeability and improved pore connectivity, without causing corrosion of components of the hydrocarbon producing well.

Surface Charge and Wettability

FIG. 1 depicts different ions in a water thin-film between calcite and crude oil surfaces from a brine. Without wishing to be bound by any particular theory, it is believed that dissolved ions can be adsorbed on the crude oil, calcite and brine surfaces, thereby creating an overall surface charge on each interface. The surface charge has a corresponding zeta-potential electrokinetic parameter that can be experimentally measured.

Without wishing to be bound by any particular theory, it is believed that seawater includes high concentration of divalent cations, such as $Mg'$ and $Ca'$, resulting in a positive surface charge for calcite surfaces. Adding dihydrogen phosphate ions to the seawater can create surface complexes adsorbed on the calcite that alter the surface charge to a negative surface charge from a positive surface charge. Altering the brine/carbonate zeta-potential to become more negative can create a repulsion between the brine/carbonate and brine/crude-oil interfaces, altering the wettability towards more water-wet, thereby increasing hydrocarbon recovery. The surface charges in crude oil are mainly negative due to carboxylate groups in the crude oil composition. Thus, brines containing dihydrogen phosphate ions may be expected to have a larger impact on the surface charge, as measured by zeta-potentials, of calcite/brine interfaces relative to crude oil/brine interfaces. An injection solution containing about 1000 ppm of dihydrogen phosphate ions in seawater can cause a change in the zeta-potential from positive to negative for brine/carbonate interfaces while being safe to employ in field operations and cost-effective.

Changes in the wettability, such as due to changes in the surface charge, can be observed through contact angle measurements. A decrease in the contact angle would indicate that the system is shifted to a more water-wet state, thereby leading to increased hydrocarbon production.

Chase Water

In some embodiments, a chase water is introduced to the subterranean formation after introduction of all of the injection solutions employed. In some embodiments, the amount of chase water introduced is about 0.5 to about 1.0 pore volumes, such as about 0.5 to about 0.6 pore volumes, about 0.5 to about 0.7 pore volumes, about 0.5 to about 0.8 pore volumes about 0.5 to about 0.9 pore volumes, about 0.6 to about 0.7 pore volumes, about 0.7 to about 0.8 pore volumes, about 0.7 to about 0.9 pore volumes, about 0.7 to about 1.0 pore volumes, about 0.8 to about 0.9 pore volumes, about 0.8 to about 1.0 pore volumes, about 0.9 to about 1.0 pore volumes, about 0.5 to about 0.6 pore volumes, about 0.7 pore volumes, about 0.8 pore volumes, about pore volumes, or about 1.0 pore volumes. In some embodiments, the amount of chase water introduced is about 1.0 pore volumes. In some embodiments, the chase water contains aquifer water, surface water and/or seawater.
Methods of Using the Injection Solutions Containing Dihydrogen Phosphate Ions for WaterFlooding Thus, provided in the disclosure are methods of using the injection solutions described herein for waterflooding. In some embodiments, the methods of the present disclosure result in increased oil recovery, such as from a carbonate formation.

Provided in the present disclosure is a method of waterflooding, where the method involves introducing a first injection solution including about 400 ppm to about 1000 ppm of dihydrogen phosphate ions into a subterranean formation, followed by introduction of a second injection solution including dihydrogen phosphate ions with a concentration of dihydrogen phosphate ions of about 200 ppm to about 800 ppm, and a concentration of dihydrogen phosphate ions of at least about 200 ppm less than the first injection solution into a subterranean formation, thereby displacing at least a portion of a hydrocarbon present in the subterranean formation. In some embodiments, the first solution and/or the second solution has a pH of about 5.0 to 5.5. In some embodiments, the first solution and/or the second solution includes seawater. In some embodiments, an amount of the first solution and/or the second solution introduced into the subterranean formation is about 0.3 to 0.5 pore volumes. In some embodiments, the first injection solution includes 1000 ppm of dihydrogen phosphate ions. In some embodiments, a chase solution, including aquifer water, surface water, seawater, or combinations thereof, is introduced into the subterranean formation after the first and second injection solutions. In some embodiments, an amount of the chase solution introduced into the subterranean formation is about 0.5 to about 1.0 pore volumes. In some embodiments, the subterranean formation includes a carbonate formation. In some embodiments, the first injection solution is introduced after primary production of a hydrocarbon from the subterranean formation. In some embodiments, the method of waterflooding further includes producing the hydrocarbon from the subterranean formation.

Also provided in the present disclosure is a method of waterflooding, where the method involves introducing a first injection solution including about 1000 ppm of dihydrogen phosphate ions into a subterranean formation; introducing a second injection solution including about 800 ppm of dihydrogen phosphate ions into the subterranean formation; introducing a third injection solution including about 600 ppm of dihydrogen phosphate ions into the subterranean formation; introducing a fourth injection solution including about 400 ppm of dihydrogen phosphate ions into the subterranean formation; and introducing a fifth injection solution including about 200 ppm of dihydrogen phosphate ions into the subterranean formation, wherein at least one of the first injection solution, the second injection solution, the third injection solution, the fourth injection solution, and the fifth injection solution displaces at least a portion of a hydrocarbon present in the subterranean formation. In some embodiments, the first injection solution, the second injection solution, the third injection solution, the fourth injection solution, and/or the fifth injection solution has a pH of about 5.0 to about 5.5. In some embodiments, the first injection solution, the second injection solution, the third injection solution, the fourth injection solution, and/or the fifth injection solution includes seawater. In some embodiments, an amount of the first injection solution, the second injection solution, the third injection solution, the fourth injection solution, and/or the fifth injection solution introduced into the subterranean formation is about 0.3 to about pore volumes. In some embodiments, a chase solution, including aquifer water, surface water, seawater, or combinations thereof, is introduced into the subterranean formation after the first, second, third, fourth and fifth injection solutions. In some embodiments, an amount of the chase solution introduced into the subterranean formation is about 0.5 to about 1.0 pore volumes. In some embodiments, the subterranean formation includes a carbonate formation. In some embodiments, the first injection solution is introduced after primary production of a hydrocarbon from the subterranean formation. In some embodiments, the method of waterflooding further includes producing the hydrocarbon from the subterranean formation.

EXAMPLES

Example 1—Zeta-Potential Measurements

Brine samples were prepared by adding 0 ppm, 500 ppm or 1000 ppm of sodium dihydrogen phosphate to each of the water sources in Table 1.

TABLE 1

| The composition of different brines Brine samples (concentration (mg/L)) | | | |
|---|---|---|---|
| | Seawater | Smart Water | $Na_2SO_4$ |
| $Na^+$ | 18,300 | 1824 | 1865 |
| $Cl^-$ | 32,200 | 3220 | — |
| $Ca^{2+}$ | 650 | 65 | — |
| $Mg^{2+}$ | 2,110 | 211 | — |
| $SO_4^{-2}$ | 4,290 | 429 | 3896 |
| HCO3— | 120 | — | — |
| Total dissolved Solids, ppm | 57,670 | 5,761 | 5,761 |
| Initial pH | 7.66 | 7.29 | 6.58 |

Contaminants were removed from the crude oil sample by filtration and centrifugation. Oil/brine emulsions were prepared by adding an oil drop to 5 mL of each brine. A pure calcium carbonate disk that was 99 wt. % $CaCO_3$ was used for the calcine/brine suspensions. X-ray diffraction (XRD) was used to confirm the calcite purity. A granite mill was used to grind the calcite disk at ambient conditions without introducing contaminants. For the calcite/brine suspension, 20 mL of each brine was mixed with 0.1 g of fine powder of ground calcite, then 5 mL of the brine with ground calcite was transferred to a new vial with 15 mL of calcite free brine. The samples were sonicated after each step involving a suspension to prevent the agglomeration of particles. In order to maintain consistent experimental conditions, solid/liquid and liquid/liquid proportions were kept fixed.

Zeta-potential measurements were conducted via phase analysis light scattering using ZetaPALS instrument. Measurements were performed at least twice until consistent results were obtained. Two cells were used, one for calcite/brine suspensions and the other for oil/brine emulsions.

Figure 2:
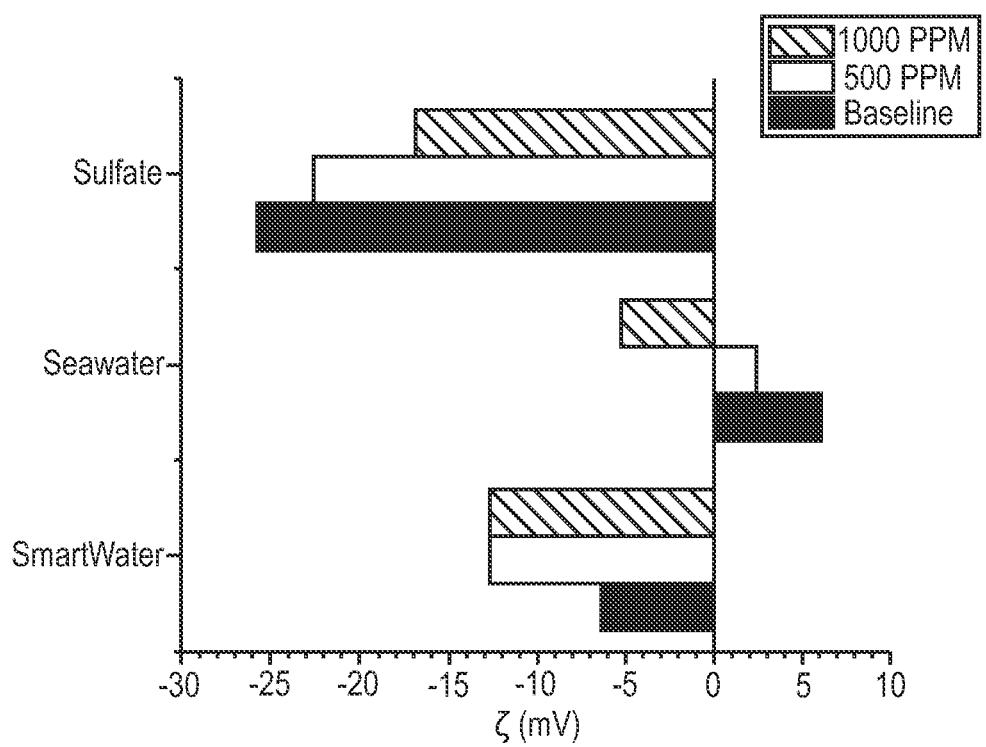
FIG. 2 shows the zeta potential values at a calcite/brine interface for different brine solutions.
Figure 3:
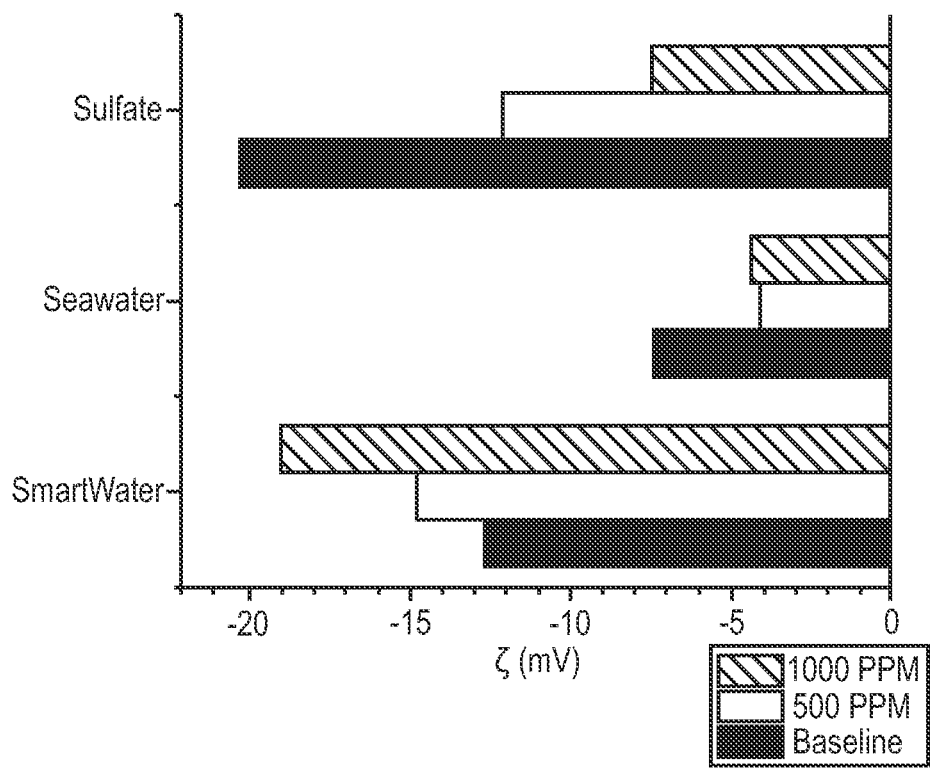
FIG. 3 shows the zeta potential values at a crude oil/brine interface for different brine solutions.

FIGS. 2 and 3 show the zeta-potential measurements for both brine/calcite and crude oil/brine interfaces, respectively, at atmospheric conditions for each of the brine samples prepared. FIG. 2 demonstrates that the sodium dihydrogen phosphate at a concentration of 1000 ppm caused the zeta-potential value to significantly decrease and shift from a positive value of 7 mV for seawater without added $NaH_2PO_4$ to a negative value of −6 mV for seawater with 1000 ppm $NaH_2PO_4$. The pH of this brine decreased from about 7.5 for seawater without added $NaH_2PO_4$ to about 5.5 for seawater with 1000 ppm of $NaH_2PO_4$.

All measured zeta-potentials for the oil/brine interface were negative, as shown in FIG. 3. Adding sodium dihydrogen phosphate altered the magnitude of the zeta-potentials.

The results demonstrate that sodium dihydrogen phosphate has a greater impact on the zeta-potentials of calcite/brine interfaces relative to crude oil/brine interfaces which did not have an appreciable trend.

Example 2—Contact Angle Measurements

Contact angle measurements were performed on seawater samples without and with 1000 ppm of sodium dihydrogen phosphate on a flat carbonate chip. The carbonate chip was saturated with brine, centrifuged, and aged in dead oil for four days. Next, the sample was mounted inside the chamber, and the baseline brine was injected. Once the chamber was filled and no leakage was observed, an oil needle was used to place a droplet at the surface of the chip. Pressure and temperature were maintained at 1000 psig and 70° C., respectively, when the tests were conducted. A video camera filmed the surface with the drop, and computer software was used to calculate the contact angle from the image.

Figure 4A:
FIGS. 4A and 4B show contact angles for different brine solutions.
Figure 4B:

The seawater had a contact angle of 135 degrees and the seawater with 1000 ppm of $NaH_2PO_4$ had a water contact angle of 90 degrees, as shown in FIGS. 4A and 4B, respectively. Adding sodium dihydrogen phosphate altered the seawater/carbonate zeta-potential to become negative (due to adsorption of dihydrogen phosphate and hydrogen phosphate negative ions), thereby creating a repulsion between the brine/carbonate and brine/crude-oil interfaces. This electrostatic repulsion stabilized the water film sandwiched between the oil drop and calcite surface and altered the wettability towards more water-wet, thereby leading to additional oil recovery. The addition of $NaH_2PO_4$ decreased the contact angle by 45 degrees, altering the system to more water-wet conditions. Thus, seawater with 1000 ppm of $NaH_2PO_4$ is the most promising brine recipe for waterflooding as the zeta-potential changed from positive to negative for seawater/calcite. 1000 ppm showed a strong effect on zeta-potential while being safe to employ in field operations and cost-effective.

Example 3—Surface Modeling

A surface complexation model was used to describe the equilibrium state of ion adsorption based on specified surface reactions and rationalize the observed behavior. To validate the model, the experimental zeta-potential values were history-matched with predicted model values by manipulating the surface-reaction equilibrium constants.

In the surface complexation model, the concentration of adsorbed surfaces complexes (adsorbed ions) determined the total surface charge as:

$$\sigma = \frac{F}{SA}\sum z_i c_i, \quad (1)$$

where $\sigma$ is the surface charge density (C/m²), F is the Faraday constant (96493.5 C/mol), S is the surface material mass (g), A is the specific surface area (m²/g), $z_i$ is the ionic electric charge, and $c_i$ is the adsorbed ion concentration (mol). The surface charge and surface-potential are related through the Gouy-Chapman model:

$$\sigma = (8000 \, \epsilon_o \, \epsilon_w \, RTI)^{1/2} \sinh\left(\frac{vF\Psi}{2RT}\right), \quad (2)$$

where $\epsilon_o$ is the vacuum permittivity $$\left(\frac{C^2}{mJ}\right),$$

$\epsilon_o$ is the water relative permittivity, $\Psi$ is the surface-potential (V), R is the gas constant $$\left(\frac{J}{molK}\right),$$

T is the temperature (K), I is the brine ionic strength (mol/l), and v is the electrolyte ionic charge which was assumed to be unity.

The site density for calcite surface was 4.95 sites/nm², while the crude oil surface had a site density of 0.47 sites/nm². The calcite specific surface area was 1 m²/g, while the crude oil specific area was 0.5 m²/g.

The intrinsic equilibrium constants (shown in table 2) were considered as fitting parameters and varied in the SCM to match the measured zeta-potentials. The site density and specific surface area of the considered surfaces were fixed.

The history-matching included surface reactions that capture the formation of dihydrogen phosphate ions on top of divalent cations as shown in Table 2.

TABLE 2

| Calcite surface complexation reactions involving divalent cations and dihydrogen phosphate | |
|---|---|
| Calcite Surface Reaction | Equilibrium Constant ($\log_{10} K_{int}$) |
| > CaOH + $Mg^{2+}$ + $H_2PO_4^-$ ↔ > $CaOMgHPO_4^-$ + $2H^+$ | −7.35 |
| > CaOH + $Ca^{2+}$ + $H_2PO_4^-$ ↔ > $CaOCHPO_4^-$ + $2H^+$ | −6.65 |
| > CaOH + $Mg^{2+}$ + $H_2PO_4^-$ ↔ > $CaOMgH_2PO_4^-$ + $H^+$ | −2.65 |
| > CaOH + $Ca^{2+}$ + $H_2PO_4^-$ ↔ > $CaOCH_2PO_4^-$ + $H^+$ | −4.35 |

Figure 5:
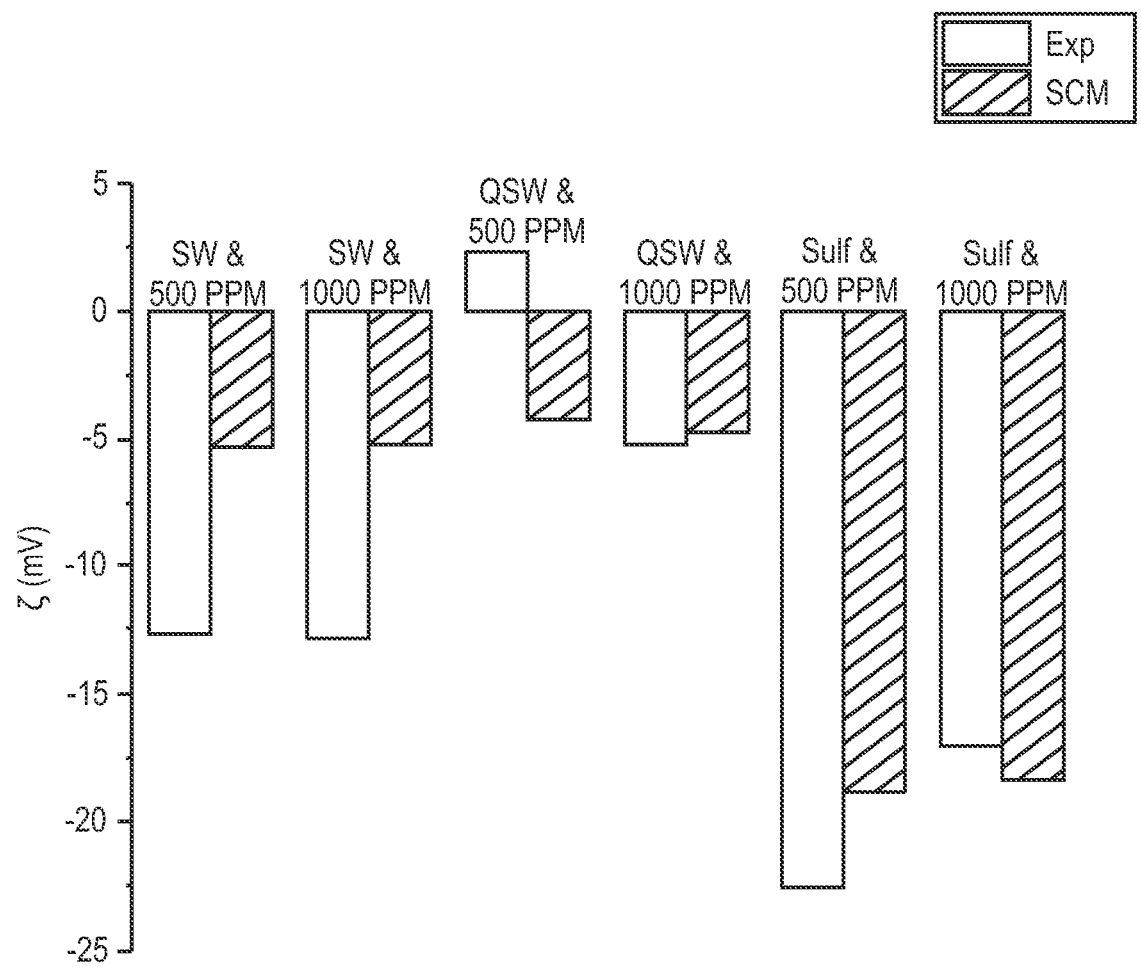
FIG. 5 shows experimental and modeled zeta potential values at a calcite/brine interface for different brine solutions.

FIG. 5 shows the comparison between the experimental and modeling results. The trend was qualitatively captured by the model.

The dihydrogen phosphate ions bind as a ternary component that mitigate the effect of positive divalent cations (magnesium and calcium), resulting in an overall negative surface-charge with a corresponding negative zeta-potential.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims. For example, in some embodiments, in addition to, or instead of a salt of dihydrogen phosphate ions, such as sodium dihydrogen phosphate and/or potassium dihydrogen phosphate, sodium chloride (NaCl) and/or sodium sulfate ($Na_2SO_4$) can be used in the injection solution for waterflooding.

What is claimed is:

1. A method of waterflooding, comprising:
    introducing a first injection solution comprising about 400 ppm to about 1000 ppm of dihydrogen phosphate ions into a subterranean formation; and
    introducing a second injection solution comprising dihydrogen phosphate ions into the subterranean formation;
    wherein the second injection solution has a concentration of dihydrogen phosphate ions of about 200 ppm to about 800 ppm, and a concentration of dihydrogen phosphate ions of at least about 200 ppm less than the first injection solution; and
    wherein at least a portion of a hydrocarbon present in the subterranean formation is displaced.

2. The method of claim 1, wherein at least one of the following holds:
    the first injection solution has a pH of about 5.0 to about 5.5; or
    the second injection solution has a pH of about 5.0 to about 5.5.

3. The method of claim 1, wherein at least one of the following holds:
    the first injection solution comprises seawater; or
    the second injection solution comprises seawater.

4. The method of claim 1, wherein at least one of the following holds:
    an amount of the first injection solution introduced into the subterranean formation is about 0.3 to about 0.5 pore volumes; or
    an amount of the second injection solution introduced into the subterranean formation is about 0.3 to about 0.5 pore volumes.

5. The method of claim 1, wherein the first injection solution comprises about 1000 ppm of dihydrogen phosphate ions.

6. The method of claim 5, wherein at least one of the following holds:
    the first injection solution comprises seawater; or
    the second injection solution comprises seawater.

7. The method of claim 1, further comprising introducing a chase solution, comprising aquifer water, surface water, seawater, or combinations thereof, into the subterranean formation.

8. The method of claim 7, wherein an amount of the chase solution introduced into the subterranean formation is about 0.5 to about 1.0 pore volumes.

9. The method of claim 1, wherein the subterranean formation comprises a carbonate formation.

10. The method of claim 1, wherein the first injection solution is introduced after primary production of a hydrocarbon from the subterranean formation.

11. The method of claim 1, further comprising producing the hydrocarbon from the subterranean formation.

12. A method of waterflooding, comprising:
    introducing a first injection solution comprising about 1000 ppm of dihydrogen phosphate ions into a subterranean formation;
    introducing a second injection solution comprising about 800 ppm of dihydrogen phosphate ions into the subterranean formation;
    introducing a third injection solution comprising about 600 ppm of dihydrogen phosphate ions into the subterranean formation;
    introducing a fourth injection solution comprising about 400 ppm of dihydrogen phosphate ions into the subterranean formation; and
    introducing a fifth injection solution comprising about 200 ppm of dihydrogen phosphate ions into the subterranean formation,
    wherein at least one of the first injection solution, the second injection solution, the third injection solution, the fourth injection solution, and the fifth injection solution displaces at least a portion of a hydrocarbon present in the subterranean formation.

13. The method of claim 12, wherein at least one of the first injection solution, the second injection solution, the third injection solution, the fourth injection solution, and the fifth injection solution has a pH of about 5.0 to about 5.5.

14. The method of claim 12, wherein at least one of the first injection solution, the second injection solution, the third injection solution, the fourth injection solution, and the fifth injection solution comprises seawater.

15. The method of claim 12, wherein an amount of at least one of the first injection solution, the second injection solution, the third injection solution, the fourth injection solution, and the fifth injection solution introduced into the subterranean formation is about 0.3 to about 0.5 pore volumes.

16. The method of claim 12, further comprising injecting a chase solution, comprising aquifer water, surface water, seawater, or combinations thereof, into the subterranean formation.

17. The method of claim 16, wherein an amount of the chase solution introduced into the subterranean formation is about 0.5 to about 1.0 pore volumes.

18. The method of claim 12, wherein the subterranean formation comprises a carbonate formation.

19. The method of claim 12, wherein the first injection solution is introduced after primary production of a hydrocarbon from the subterranean formation.

20. The method of claim 12, further comprising producing the hydrocarbon from the subterranean formation.

* * * * *